May 27, 1969     A. H. BEEBE, JR     3,445,909
METHOD OF MAKING BEARING MATERIAL
Filed Nov. 2, 1966
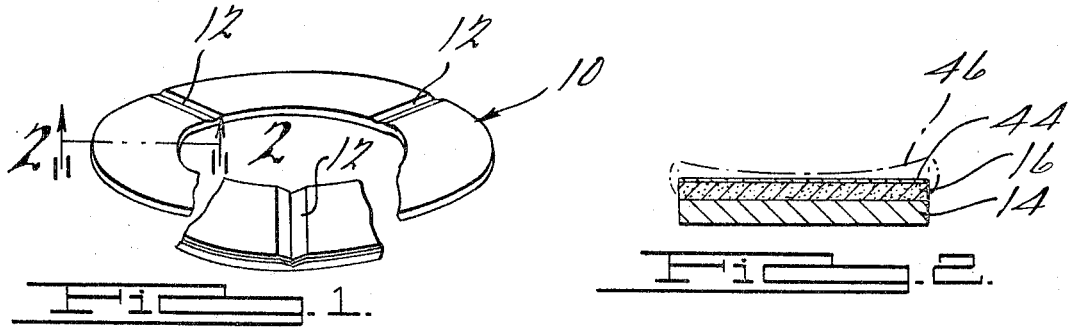
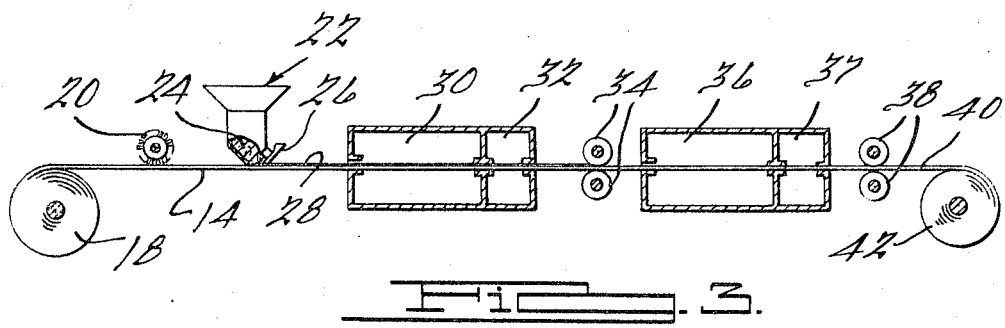
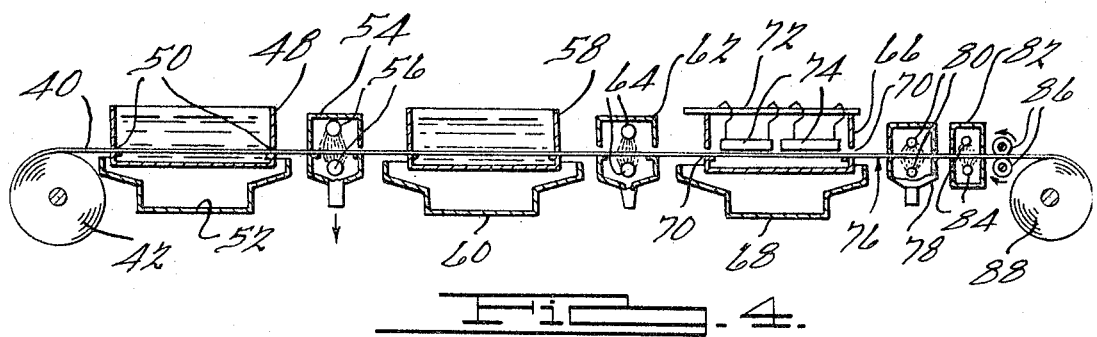
INVENTOR.
Austin H. Beebe, Jr.
BY
Harness, Dickey & Pierce
ATTORNEYS.

United States Patent Office 3,445,909
Patented May 27, 1969

3,445,909
METHOD OF MAKING BEARING MATERIAL
Austin H. Beebe, Jr., Ann Arbor, Mich., assignor to Federal-Mogul Corporation, a corporation of Michigan
Filed Nov. 2, 1966, Ser. No. 591,583
Int. Cl. B21d 53/10
U.S. Cl. 29—149.5                    9 Claims

ABSTRACT OF THE DISCLOSURE

The method of making a bearing component which comprises depositing an overplate of a soft bearing metal on one or both face surfaces of a metallic bearing substrate and thereafter compacting the overplated substrate in a manner to fill any surface pores and indentations on the face of the substrate with the overplate, and providing a substantially continous non-porous residuary film of the overplate thereon, and whereafter the resultant composite material is subjected to further metal working operations for fabricating a bearing component therefrom.

The present invention broadly relates to a method of making an improved bearing material, and more particularly, to an improved process for forming a composite bearing material comprising a metal bearing strip having on at least one face surface thereof, a substantially uniform and relatively thin layer of a soft bearing alloy, providing a surface which is substantially nonporous.

The process comprising the present invention is applicable for producing composite bearing materials which comprise a strong bearing substrate to one or both faces of which a suitable overlay metal or overplate is applied to enhance the bearing characteristics thereof. The provision of such a soft metal overlay has been found in some bearing applications to provide for substantial improvements in the fatique, seizure and scoring resistance of the bearing material, as well as to enhance its load-carrying characteristics. The overlay metal conventionally employed may comprise lead as well as alloys of lead, such as, for example, lead-tin alloys, lead-antimony alloys, lead-tin-antimony alloys, lead-tin-copper alloys, and the like.

The bearing substrate to which the soft metal overlay is applied may comprise an integral wrought bearing material such as bronze, for example; a bimetallic strip comprising a cast bearing metal on a hard metal backing strip; or alternatively, in accordance with a preferred practice of the present invention, a bimetallic strip comprising a hard metal backing strip, such as steel, for example, to one or both face surfaces of which a sintered matrix of a metallic powder is tenaciously bonded. The sintered matrix in such bimetallic bearing substrates conventionally are comprised of copper alloys, such as copper-lead, copper-tin and copper-lead-tin. The bearing substrate, incorporating a soft metal overlay on one or both surfaces thereof, is particularly applicable for the manufacture of thrust washers, although the composite bearing material can be employed for the fabrication of other bearing components such as, for example, shell-type half bearings, bushings and the like.

Various techniques have heretofore been used or proposed for use for applying a soft bearing metal overlay to one or both faces of a bearing substrate, enabling thereby the attainment of improved bearing characteristics. None of the techniques heretofore known have enabled the formation of a composite bearing material wherein the overlay metal is applied in the form of a substantially uniform and relatively thin layer providing a substantially nonporous bearing surface and wherein the resultant bearing material is of simple and economical manufacture.

For example, it has been conventional in the past to form a bearing substrate of either an integral or bimetallic struction which is subjected to fabricating operations, wherein thrust washers of an appropriate size and configuration are either stamped or blanked from a continuous strip of the bearing substrate. The thrust washers thus fabricated are thereafter subjected to an electroplating operation during which an overlay or overplate of a suitable soft bearing alloy is deposited on the surfaces thereof. The electroplating of an overlay of a soft bearing metal or metal alloy on the completed washers constitutes a tedious and costly operation, and without proper safeguards, results in the electrodeposition of the soft metal overlay on surfaces other than the bearing surface to be overplated. In addition, due to the configuration of the completed washers, the overplated bearing layer is generally of a nonuniform thickness and the bearing surface itself, when applied over a sintered matrix of a bimetallic bearing substrate, is characterized as being porous, which detracts from the load-carrying characteristics, fatigue, seizure and scoring resistance thereof. In order to overcome the disadvantages attending the nonuniformity of the electrodeposited overlay, it has heretofore been proposed to subject the overplated washer to a final machining operation, which still further detracts from the economy of the process and necessitates that overlays of a relatively large thickness be applied to permit a finish machining thereof.

Alternatively, it has heretofore been proposed to apply a soft bearing metal overlay to a substantially continuous strip of a bearing substrate, whereby the soft metal overlay is deposited in the form of a finely particulated powder and is roll compacted on one face surface thereof. The resultant strip is thereafter subjected to an elevated temperature to effect a bonding of the metal overlay to the bearing substrate. The use of this technique on bearing substrates comprising a bimetallic strip, including a porous sintered matrix thereon, has resulted in the formation of a bearing surface which is of a porous structure and wherein portions of the underlying sintered matrix are exposed. To overcome this problem, relatively thick layers of the overlay metal have been applied which, in many instances, require further machining operations to produce a bearing component of the requisite dimensional accuracy. In view of the tolerances involved in finish machining operations, the resultant bearing overlay is relatively thick and it is not uncommon that the overlay metal is forced, during use and under the bearing loads encountered, to flow into suitable oil grooves and passages embossed on the bearing surface, thereby restricting the flow of lubricant and, eventually, resulting in a premature failure of the bearing components.

It is, accordingly, a principal object of the present invention to provide an improved process for making a composite bearing material incorporating a soft metal bearing overlay on the bearing face thereof, which overcomes the problems and disadvantages associated with processes of the types heretofore known.

Another object of the present invention is to provide an improved process which enables the attainment of a composite bearing material characterized by a soft bearing metal overlay on the bearing surface thereof, which is substantially nonporous and which, moreover, is substantially uniform, extremely thin and of a controlled thickness, providing for improved load-bearing and fatigue resistance and better maintenance of dimensional tolerances than similar type bearing materials heretofore known.

Yet, still another object of the present invention is to provide an improved process for making a bearing material incorporating a thin, substantially uniform and nonporous metal overlay on the bearing face thereof, which is applied in a continuous manner to a strip of the bearing material, enabling fabrication thereof into bearing components of the requisite size and shape without necessitating any further finish machining of the completed bearing components.

A further object of the present invention is to provide an improved process for making a composite bearing material which is of simple and versatile control and further porvides for substantial improvements in the economy and the performance of the composite bearing material produced thereby.

The foregoing and other objects and advantages of the present invention are achieved by subjecting one or both exposed face surfaces of a bearing substrate strip to an electroplating operation during which a thin controlled layer of a soft metal bearing material is deposited thereon. The resultant composite bearing material is thereafter subjected to a roll compacting operation wherein the soft bearing metal overplate is forced into any surface pores or surface irregularities present on the face of the bearing substrate, and whereby a simultaneous gauging of the overplate is accomplished so as to provide a substantially uniform, relatively thin and nonporous residual soft bearing metal overplate thereon. The resultant composite overplated bearing material is thereafter subjected to further fabricating operations to form thrust washers or other bearing components of the requsite size and configuration.

The bearing substrate, in accordance with a preferred embodiment of the present invention, comprises a bimetallic strip consisting of a strong metal backing strip on one or both face surfaces of which a sintered metallic powder matrix is tenaciously bonded. It is also contemplated that the bearing substrate may comprise a wrought strip of a bearing material such as bronze or aluminum, for example, as well as a cast layer of a bearing material such as aluminum or bronze, for example, which is applied to and supported on a strong metal backing strip such as steel.

Other objects and advantages of the present invention will become apparent upon a reading of the following description, taken in conjunction with the accompanying drawings, wherein:

FIGURE 1 is a perspective view with a portion thereof broken away, and magnified in size, illustrating a typical bearing component fabricated from the overplated bearing strip made in accordance with the practice of the present invention;

FIGURE 2 is a transverse sectional view through the bearing component shown in FIGURE 1, and taken substantially along the line 2—2 thereof;

FIGURE 3 is a schematic side elevational view of a process for making the bimetallic strip;

FIGURE 4 is a schematic side elevational view of the process by which the bimetallic strip is electroplated and further compacted forming therewith a composite strip;

FIGURE 5 is a magnified transverse sectional view similar to that shown in FIGURE 2, but illustrating a bearing material comprising a strong metal backing strip having on each face thereof a cast bearing material to the faces of which an overlay of a soft bearing metal is applied; and FIGURE 6 is a magnified cross-sectional view similar to a micrograph illustrating the substantial uniformity and lack of porosity of the overplated bearing surface of the composite bearing material made in accordance with the process comprising the present invention.

The percentages of the compositions of the metals and metal alloys as herein described, and as set forth in the subjoined claims, are employed in terms of percentages by weight unless otherwise specified.

The process comprising the present invention, and the composite bearing material produced thereby, is particularly adaptable for use in the manufacture of thrust-type washers, such as, for example, thrust washers for the crankshaft of internal combustion engines, thrust washers for the gear shaft components of automatic transmissions, thrust washers or wearplates for various pumps, etc. Thrust washers of the foregoing type are conventionally stamped or blanked from the composite bearing strip produced in accordance with the present process, and may be subjected to further coining or stamping operations to impart suitable indentations or other cavities in the bearing face thereof to facilitate retention of the grease or oil lubricants employed during use. A typical thrust washer 10 is illustrated in FIGURE 1, which is formed with three radially extending oil grooves 12 of a V-shaped cross section which can be readily incorporated by a coining operation. As previously mentioned, a problem heretofore encountered when using overplated bearing materials for the formation of thrust washers was the tendency of the overplated soft bearing material to flow into the V-shaped oil grooves 12, resulting in a partial or complete blockage thereof, thereby preventing adequate quantities of lubricant from reaching the bearing surfaces. This situation results from either an excessive thickness of the overlay soft bearing material on the bearing face of the thrust washer or, alternatively, nonuniformity in the thickness of the overlay. The foregoing problem is overcome in accordance with the bearing material produced in accordance with the practice of the present invention, whereby the overplate can be accurately controlled within a range of from about 0.0001 to about 0.001 inch, and preferably, from about 0.0002 to about 0.0004 inch.

The construction of a composite bearing material in accordance with one embodiment of the present invention is best seen in FIGURE 2 and comprises a hard metal backing strip 14, which is preferably made of steel or other high strength metal, for supporting a sintered layer 16, which is tenaciously bonded to one face surface thereof. The steel backing strip 14 conventionally comprises low carbon and low alloy steels, such as SAE type 1010, 1020 or 1030, or the like, which are of sufficient ductility to enable subsequent fabrication of the composite bearing strip into thrust washers of a suitable configuration, while at the same time providing adequate support for the sintered powder matrix which is bonded to one face surface thereof. It is also contemplated within the scope of the present invention that the face of the backing strip 14 can be provided with a suitable electroplate, such as copper, for example, to prevent corrosion or oxidation attack of the face of the backing strip and to enhance the strength of the bond formed with the sintered layer.

The sintered layer 16, defining the matrix, conventionally comprises a copper base alloy, which preferably contains up to about 10% by weight tin, from about 8% to about 35% by weight lead, up to about 4% zinc in addition to the conventional impurities, with the balance consisting essentially of copper. It will be understood that alternative suitable sintered layers of alloys other than copper base alloys can be satisfactorily employed for achieving the benefits of the present invention. Typical sintered bronze alloys of the foregoing type include SAE type 797, comprising 80% copper, 10% tin and 10% lead; SAE type 798, comprising 84% copper, 4% tin, 8% lead, and a maximum of 4% zinc; and SAE type 799, comprising 72% copper, 3.5% tin, 23% lead, and a maximum of 3% zinc.

The sintered layer is formed in accordance with techniques well known in the art, preferably employing prealloyed powders of a spherical configuration having a size generally less than about 100 mesh Tyler. The sintered alloy can also be formed from an admixture of appropriate proportions of substantially pure metal powders, but, in most instances, this constitutes a more costly practice. A powder layer is generally applied such that at the completion of the process, a residuary compacted sintered layer of from about 0.005 up to about 0.025 inch thick, and more usually about 0.010 inch thick, is formed.

The formation of the composite strip comprising the hard metal backing strip 14 having the sintered layer 16 tenaciously bonded to one face thereof is schematically illustrated in FIGURE 3. As shown in FIGURE 3, the backing strip 14 is continuously unwound from a feed spool 18 and passes beneath a suitable cleaning device, such as a rotary brush 20, effecting a cleaning of the upper face surface thereof. The backing strip 14 thereafter moves in a substantially horizontal direction beneath a feed hopper 22 containing a suitable blend of elemental and/or pre-alloyed metal powder of an appropriate composition. The metallic powder, indicated at 24, is applied to the upper surface of the backing strip 14 through a suitable metering aperture formed in the based of the feed hopper 22, after which the strip with the powder blend thereon passes beneath a suitable spreader or doctor blade 26, which spreads the powder into a substantially uniform powder layer 28 of a controlled thickness.

The backing strip with the layer of metal powder on the upper surface thereof thereafter passes into a preliminary sintering chamber 30, which preferably contains a reducing atmosphere, and in which the powder layer is heated to an appropriate temperature to effect a bonding of the metal powder particles to each other and to the face of the backing strip. In the case of copper alloy powders of the types hereinbefore described, sintering temperatures of a range of from about 1500° F. to about 1600° F. have been found satisfactory. Upon emerging from the sintering chamber 30, the backing strip and powder layer passes into a cooling chamber 32 in which the material is reduced to an intermediate temperature approaching room temperature, after which it emerges and passes through a pair of compacting rolls indicated at 34. The compacting rolls effect a densification of the powder layer 28 and a substantial reduction in the porosity thereof. In this regard, it has been found that the powder layer is reduced in thickness from about 40 to 50% during the sintering and compacting operations such that the initial powder layer is applied in a thickness of 1.8 to about two times the thickness of the sintered layer 16 desired.

In accordance with a preferred practice of making the composite strip, the powder layer 28 is subjected to a second sintering operation after the roll compacting step. When employing such dual sintering steps, the first sintering operation primarily effects a bond of the metal powder to the hard metal backing strip, while the second sintering operation serves primarily in perfecting the bonding of the metallic powder particles to each other so as to form an integral sintered matrix. By employing two sintering operations, the first followed by a roll compacting step, a sintered matrix of a substantially reduced porosity is obtained, which further enhances the bearing properties of the composite bearing material made in accordance with the practice of the present invention. The sintered porous matrix conventionally has a porosity of less than 10% by volume approaching a theoretical dense body at least in that region spaced from the exposed face surface thereof. The face surface of the sintered matrix is characterized as being relatively porous as a result of the soft metal constituents passing inwardly from the surface into the body of the sintered matrix upon being melted during the course of the sintering operation. Surface porosity also occurs as a result of the contraction of the liquid phase during cooling of the matrix. Ordinarily the face surface of the sintered matrix thus produced is relatively low in lead content in comparison to the internal portions of the matrix. The surface is also characterized as having surface pores and a porosity generally upwards of 20% to depths as great as about 0.003 inch from the surface.

As diagrammatically shown in FIGURE 3, the backing strip 14, with the preliminarily sintered and compacted powder layer 28 thereon, passes from the compacting rolls 34 into the inlet side of a second sintering chamber 36 provided with a protective atmosphere, such as a cracked gas atmosphere, for example, or alternative reducing atmosphere of the types well known in the art in which the strip is again heated to an elevated temperature. The heated strip thereafter passes into a second cooling chamber 37 in which it is cooled to a substantially reduced temperature approaching that of room temperature and again emerges and is advanced by a pair of pull rolls 38. The composite strip thus formed, which is indicated at 40, can be directly passed from the outlet end of the pull rolls 38 into the continuous strip overplating process diagrammatically illustrated in FIGURE 4, or may conveniently be wound in the form of a feed spool 42, which can be stored and thereafter transported to the inlet side of the process illustrated in FIGURE 4.

The composite strip 14, produced in accordance with the process schematically illustrated in FIGURE 3 and as typified in FIGURE 2, can also be processed so as to effect the application of a sintered matrix to both faces of the hard metal backing strip. This latter construction is typical for the manufacture of double-faced washers, whereby an overplate is applied to each face surface thereof as subsequently to be described. A double-face bearing construction of an alternative structure is illustrated in FIGURE 5 comprising a hard metal backing strip 14' of a type previously described in connection with FIGURE 2. To each face surface of the backing strip 14', a cast layer of a bearing material such as bronze or aluminum, for example, is tenaciously bonded forming a composite bearing strip. It is also contemplated that the bearing strip substrate may comprise an integral wrought bearing material such as a wrought solid bronze strip of a type SAE 791. One or both face surfaces of the solid wrought bearing substrate can be provided with an overlay of a soft metal alloy in a manner subsequently to be described.

The composite strip 40, in accordance with the preferred embodiment of the present invention, made by the process illustrated in FIGURE 3, is thereafter subjected to an electroplating operation whereby a thin uniform overlay or overplate, indicated at 44 in FIGURE 2, is applied to the face surface of the sintered layer 16. The overplate comprises a soft metal possessing bearing characteristics of which lead constitutes the preferred material. If desired, the lead may be alloyed with up to 20% by weight tin to enhance the strength and corrosion resistance of the metal overplate. In accordance with a preferred practice of the present invention, the overplate metal comprises a lead-tin alloy containing from about 8% to about 12% tin. The thickness of the overplate applied can range from about 0.0001 up to about 0.001 inch, and preferably from about 0.0002 to about 0.0004 inch. The overplate on the composite strip is subjected to a final compacting operation in a manner subsequently to be described, in which the overplate is forced into the surface irregularities and pores of the sintered layer 16, effecting a slight decrease in the thickness of the residual film of overplate on the sintered matrix. Accordingly, depending on the specific porosity and irregularities on the face of the sintered layer 16, an overplate is applied such that at the completion of the final compacting step, a residuary overplate layer, preferably of about 0.0002 to about 0.0004 inch, is present.

The overplate 44, as illustrated in FIGURE 2, is of an exaggerated thickness for the purposes of clarity. Thicknesses of the overplate within the aforementioned broad and preferred ranges, have been found to provide satisfactory bearing characteristics with increased resistance to scoring, seizure and fatigue, while at the same time preventing any appreciable wiping or flow of the overplate into the V-shaped oil grooves 12 of a thrust washer as shown in FIGURE 1. In contrast, overplates applied in accordance with the processes heretofore known to finished thrust washers, resulted in a nonuniform plating which is thicker adjacent to the edges of the washer, while relatively thin along the central region thereof. This unevenness, characteristic of prior art thrust washers, is indicated by the dotted line 46 in FIGURE 2. It was not uncommon in order to attain an overplate thickness of about 0.0003 inch as the minimum on the face of the thrust washer to sustain an overplate buildup of 0.001 inch or greater adjacent to the edges thereof, as typified by the dotted lines 46. Accordingly, during use of the washer, the bearing loads imposed thereon occasioned a flow of the overplate adjacent to the edges into the V-shaped oil grooves 12, effecting either partial or substantially complete blockage thereof, preventing adequate lubrication of the bearing surface and premature failure of the thrust washer.

The overplate 44, in accordance with the practice of the present invention, is preferably applied in a continuous strip plating apparatus, diagrammatically illustrated in FIGURE 4. As shown in the drawing, the feed spool 42 of the composite strip 40, or the composite strip produced directly from the process illustrated in FIGURE 3, is extended in a horizontal direction with the sintered layer upwards and passes into a slot formed at the inlet side of a cleaning tank 48 to remove contaminating substances from the surface of the composite strip. The overflow from the cleaning tank 48, and the leakage from the slots 50 in the ends thereof, passes downwardly into a suitable catch basin 52, from which the solution, after further processing, can be recycled back into the cleaning tank 48. Upon emergence from the cleaning tank 48, the composite strip 40 passes through a shroud 54, incorporating spray nozzles 56 therein, which effect a spray rinsing of the cleaned composite strip. The composite strip thereafter enters the inlet side of a suitable acid pickle tank 58, which is provided with a catch basin 60 therebelow, and subsequently emerges into a shroud 62 containing nozzles 64, in which the composite strip is again spray rinsed.

The cleaned and pickled composite strip thereafter passes into the inlet side of a plating tank 66, provided with a catch basin 68 therebelow for recovering any solution leaking from the inlet and outlet slots 70 of the plating tank. An electrified bus bar 72 extends above the plating tank 66, from which anodes 74 are removably supported, and which are preferably composed of a suitable lead or lead-tin alloy. The length of the plating tank 66, the speed of travel of the composite strip therethrough, the composition of the electroplating solution, and the current density are controlled so as to effect a relatively uniform overplate on the face surface of the sintered layer having a thickness within the ranges as hereinbefore set forth. As will be noted, the plating tank is of a width such that the lower surface of the steel backing strip is substantially shielded from the anodes 74 such that substantially no lead or lead alloy deposit occurs on the edges and back surface of the composite strip. The presence of such an electroplating on the edges of back surfaces of bearing components which are overplated after fabrication not only constitutes an uneconomical usage of the soft bearing alloy, but further, renders single face thrust washers susceptible to misalignment and improper clearances after short periods of use due to the flow of the soft bearing material on the back surfaces thereof.

The overplated composite strip, indicated at 76, on emergence from the plating tank 66 passes through a shroud 78 having spray nozzles 80 therein, effecting a spray rinsing of the composite strip. The overplated composite strip 76 thereafter passes through a shroud 82 having nozzles 84 therein, through which a pressurized gas or air is discharged, effecting a substantially complete drying of the strip. The overplated composite strip thereafter passes between a pair of compacting rolls 86 in which the overplate is forced downwardly into the surface irregularities and pores present in the face of the sintered layer, rendering the surface substantially nonporous and further leaving an accurately gauged, substantially continuous overplate of a uniform and controlled thickness. The resultant compacted composite strip is wound up in a suitable supply reel 88, in which form it is transported to the machining and fabricating operation by which washers or other suitable bearing components are stamped, blanked and otherwise fabricated therefrom. The resultant formed washers require no further final machining of the overplate surface thereof, which provides for a substantial improvement in the economy and bearing characteristics of the bearing produced.

The metallurgical structure of the face surface of the composite bearing material illustrated in FIGURE 2, and made in accordance with the process shown in FIGURES 3 and 4, is illustrated in FIGURE 6. FIGURE 6 is based on a photomicrograph of a polished cross section taken at a magnification of 500 of a composite bearing material prepared from a sintered SAE type 799 powder blend, which is overplated with a 90% lead-10% tin alloy at a thickness of 0.0003 inch. As will be noted, the metallurgical structure comprises a substantially continuous phase, indicated at 90, of bonded predominantly copper-tin particles with discontinuous internal phases 92 of substantially pure lead. The upper face, as viewed in FIGURE 6, consists of the overplate 44, which extends downwardly and completely fills the surface pores of the sintered matrix. The surface of the composite bearing material is, accordingly, rich in lead and the soft lead-tin bearing alloy is disposed as a substantially continuous thin film over the surface thereof and is of a uniform thin thickness heretofore unobtainable in either post-overplated or post-machined overplated bearing components.

In a similar manner, as previously described in connection with FIGURE 4, an overplate can be applied to both faces of a composite bearing substrate comprising a backing strip 14 having a sintered matrix 16 bonded to each face surface thereof, or alternatively, to both face surfaces of the cast bearing material 15, forming overlays 44′, as shown in FIGURE 5. The application of an overlay to each face surface can be achieved simultaneously in the process as illustrated in FIGURE 4 by positioning anodes 74 adjacent to each face surface of the strip being processed. In regard to double-faced bearing strips, concurrent compacting and gauging of the overplate on each face surface thereof is achieved simultaneously upon passage through suitable compacting rolls following the electroplating operation.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. The method of making bearing components which comprises the steps of forming a strip of a metallic bearing substrate, depositing an overplate of a soft bearing metal consisting predominantly of lead on at least one face of said strip in a thickness of from about 0.0001 to about 0.001 inch, compacting the overplated said strip effecting a filling of any surface pores and indentations on the face of said strip with said overplate and leaving a substantially continuous nonporous residuary film of said overplate thereon, and thereafter subjecting the resultant strip to metal working operations for fabricating bearing components therefrom.

2. The method as described in claim 1, wherein said overplate comprises a lead alloy containing up to about 20% tin.

3. The method as described in claim 1, wherein said overplate is deposited in a thickness of from about 0.0002 to about 0.0004 inch.

4. The method as described in claim 1, wherein said overplate comprises a lead alloy containing from about 8% to about 12% tin.

5. The method as described in claim 1, wherein said strip of a metallic bearing substrate comprises a hard metal backing strip having a densified sintered metallic powder matrix tenaciously bonded to at least one face surface thereof.

6. The method as described in claim 5, wherein said matrix contains up to about 10% tin, from about 8% to about 35% lead, up to about 4% zinc, and the balance copper.

7. The method as described in claim 6 wherein said matrix is of a thickness ranging from about 0.005 to about 0.025 inch.

8. The method as described in claim 1, wherein said strip of said metallic bearing substrate comprises a wrought strip of bronze.

9. The method as described in claim 1, wherein said strip of said metallic bearing substrate comprises a hard metal backing strip having a layer of a cast bearing metal selected from the group consisting of bronze and aluminum on at least one face surface thereof and tenaciously bonded thereto.

References Cited

UNITED STATES PATENTS

| | | | |
|---|---|---|---|
| 2,017,448 | 10/1935 | Stockfleth | 29—149.5 |
| 2,096,252 | 10/1937 | Koehring | 29—149.5 X |
| 2,902,748 | 9/1959 | Schaefer | 29—149.5 |
| 3,180,008 | 4/1965 | Elderkin et al. | 29—528 X |

THOMAS H. EAGER, *Primary Examiner.*

U.S. Cl. X.R.

29—528